US011921633B2

(12) United States Patent
Miller et al.

(10) Patent No.: US 11,921,633 B2
(45) Date of Patent: Mar. 5, 2024

(54) DEDUPLICATING DATA BASED ON RECENTLY READING THE DATA

(71) Applicant: PURE STORAGE, INC., Mountain View, CA (US)

(72) Inventors: Ethan L. Miller, Santa Cruz, CA (US); Ronald Karr, Palo Alto, CA (US)

(73) Assignee: PURE STORAGE, INC., Santa Clara, CA (US)

(*) Notice: Subject to any disclaimer, the term of this patent is extended or adjusted under 35 U.S.C. 154(b) by 0 days.

(21) Appl. No.: 17/728,468

(22) Filed: Apr. 25, 2022

(65) Prior Publication Data

US 2022/0244873 A1    Aug. 4, 2022

Related U.S. Application Data

(63) Continuation of application No. 16/892,221, filed on Jun. 3, 2020, now Pat. No. 11,360,682, which is a
(Continued)

(51) Int. Cl.
*G06F 12/08* (2016.01)
*G06F 3/06* (2006.01)
(Continued)

(52) U.S. Cl.
CPC ........ *G06F 12/0802* (2013.01); *G06F 3/0608* (2013.01); *G06F 3/0641* (2013.01);
(Continued)

(58) Field of Classification Search
CPC .. G06F 12/0802; G06F 3/0608; G06F 3/0641; G06F 3/0685; G06F 12/122; G06F 12/128; G06F 3/0656; G06F 2212/1044
(Continued)

(56) References Cited

U.S. PATENT DOCUMENTS 5,706,210 A    1/1998  Kumano et al.
5,799,200 A    8/1998  Brant et al.
(Continued)

FOREIGN PATENT DOCUMENTS

EP    0725324 A2    8/1996
WO    2012087648 A2    6/2012
(Continued)

OTHER PUBLICATIONS

Bellamy-McIntyre et al., "OpenID and the Enterprise: A Model-based Analysis of Single Sign-On Authentication", 15th IEEE International Enterprise Distributed Object Computing Conference (EDOC), Aug. 29, 2011, pp. 129-138, IEEE Computer Society, USA, DOI: 10.1109/EDOC.2011.26, ISBN: 978-1-4577-0362-1.
(Continued)

*Primary Examiner* — Hua J Song

(57) ABSTRACT

Deduplicating data based on recently reading the data, including: determining whether a calculated signature for write data matches a particular signature corresponding to data that was recently read from the storage device, wherein the signature is calculated using the write data as input; and after determining that the calculated signature for the write data matches the particular signature, obtaining the data that was recently read and comparing the data that was recently read to the write data.

20 Claims, 6 Drawing Sheets

Related U.S. Application Data continuation of application No. 15/418,253, filed on Jan. 27, 2017, now Pat. No. 10,761,759, which is a continuation of application No. 14/722,249, filed on May 27, 2015, now Pat. No. 9,594,678.

(51) Int. Cl.
  *G06F 12/0802* (2016.01)
  *G06F 12/122* (2016.01)
  *G06F 12/128* (2016.01)

(52) U.S. Cl.
  CPC .......... *G06F 3/0685* (2013.01); *G06F 12/122* (2013.01); *G06F 12/128* (2013.01); *G06F 3/0656* (2013.01); *G06F 2212/1044* (2013.01)

(58) Field of Classification Search
  USPC ........................................................ 711/136
  See application file for complete search history.

(56) References Cited

U.S. PATENT DOCUMENTS

| | | | |
|---|---|---|---|
| 5,933,598 A | 8/1999 | Scales et al. | |
| 6,012,032 A | 1/2000 | Donovan et al. | |
| 6,085,333 A | 7/2000 | Dekoning et al. | |
| 6,643,641 B1 | 11/2003 | Snyder | |
| 6,647,514 B1 | 11/2003 | Umberger et al. | |
| 6,789,162 B1 | 9/2004 | Talagala et al. | |
| 7,089,272 B1 | 8/2006 | Garthwaite et al. | |
| 7,107,389 B2 | 9/2006 | Inagaki et al. | |
| 7,146,521 B1 | 12/2006 | Nguyen | |
| 7,334,124 B2 | 2/2008 | Pham et al. | |
| 7,437,530 B1 | 10/2008 | Rajan | |
| 7,493,424 B1 | 2/2009 | Bali et al. | |
| 7,669,029 B1 | 2/2010 | Mishra et al. | |
| 7,689,609 B2 | 3/2010 | Lango et al. | |
| 7,743,191 B1 | 6/2010 | Liao | |
| 7,899,780 B1 | 3/2011 | Shmuylovich et al. | |
| 8,042,163 B1 | 10/2011 | Karr et al. | |
| 8,086,585 B1 | 12/2011 | Brashers et al. | |
| 8,200,887 B2 | 6/2012 | Bennett | |
| 8,271,700 B1 | 9/2012 | Annem et al. | |
| 8,387,136 B2 | 2/2013 | Lee et al. | |
| 8,437,189 B1 | 5/2013 | Montierth et al. | |
| 8,465,332 B2 | 6/2013 | Hogan et al. | |
| 8,527,544 B1 | 9/2013 | Colgrove et al. | |
| 8,566,546 B1 | 10/2013 | Marshak et al. | |
| 8,578,442 B1 | 11/2013 | Banerjee | |
| 8,613,066 B1 | 12/2013 | Brezinski et al. | |
| 8,620,970 B2 | 12/2013 | English et al. | |
| 8,751,463 B1 | 6/2014 | Chamness | |
| 8,762,642 B2 | 6/2014 | Bates et al. | |
| 8,769,622 B2 | 7/2014 | Chang et al. | |
| 8,800,009 B1 | 8/2014 | Beda et al. | |
| 8,812,860 B1 | 8/2014 | Bray | |
| 8,850,546 B1 | 9/2014 | Field et al. | |
| 8,898,346 B1 | 11/2014 | Simmons | |
| 8,909,854 B2 | 12/2014 | Yamagishi et al. | |
| 8,931,041 B1 | 1/2015 | Banerjee | |
| 8,949,863 B1 | 2/2015 | Coatney et al. | |
| 8,984,602 B1 | 3/2015 | Bailey et al. | |
| 8,990,905 B1 | 3/2015 | Bailey et al. | |
| 9,081,713 B1 | 7/2015 | Bennett | |
| 9,124,569 B2 | 9/2015 | Hussain et al. | |
| 9,134,922 B2 | 9/2015 | Rajagopal et al. | |
| 9,189,334 B2 | 11/2015 | Bennett | |
| 9,209,973 B2 | 12/2015 | Aikas et al. | |
| 9,250,823 B1 | 2/2016 | Kamat et al. | |
| 9,300,660 B1 | 3/2016 | Borowiec et al. | |
| 9,311,182 B2 | 4/2016 | Bennett | |
| 9,418,011 B2 | 8/2016 | Soares et al. | |
| 9,444,822 B1 | 9/2016 | Borowiec et al. | |
| 9,507,532 B1 | 11/2016 | Colgrove et al. | |
| 9,632,870 B2 | 4/2017 | Bennett | |
| 10,761,759 B1 | 9/2020 | Karr et al. | |
| 2002/0013802 A1 | 1/2002 | Mori et al. | |
| 2003/0145172 A1 | 7/2003 | Galbraith et al. | |
| 2003/0191783 A1 | 10/2003 | Wolczko et al. | |
| 2003/0225961 A1 | 12/2003 | Chow et al. | |
| 2004/0080985 A1 | 4/2004 | Chang et al. | |
| 2004/0111573 A1 | 6/2004 | Garthwaite | |
| 2004/0153844 A1 | 8/2004 | Ghose et al. | |
| 2004/0193814 A1 | 9/2004 | Erickson et al. | |
| 2004/0260967 A1 | 12/2004 | Guha et al. | |
| 2005/0160416 A1 | 7/2005 | Jamison et al. | |
| 2005/0188246 A1 | 8/2005 | Emberty et al. | |
| 2005/0216800 A1 | 9/2005 | Bicknell et al. | |
| 2006/0015771 A1 | 1/2006 | Van Gundy et al. | |
| 2006/0129817 A1 | 6/2006 | Borneman et al. | |
| 2006/0161726 A1 | 7/2006 | Lasser | |
| 2006/0230245 A1 | 10/2006 | Gounares et al. | |
| 2006/0239075 A1 | 10/2006 | Williams et al. | |
| 2007/0022227 A1 | 1/2007 | Miki | |
| 2007/0028068 A1 | 2/2007 | Golding et al. | |
| 2007/0055702 A1 | 3/2007 | Fridella et al. | |
| 2007/0109856 A1 | 5/2007 | Pellicone et al. | |
| 2007/0150689 A1 | 6/2007 | Pandit et al. | |
| 2007/0168321 A1 | 7/2007 | Saito et al. | |
| 2007/0220227 A1 | 9/2007 | Long | |
| 2007/0294563 A1 | 12/2007 | Bose | |
| 2007/0294564 A1 | 12/2007 | Reddin et al. | |
| 2008/0005587 A1 | 1/2008 | Ahlquist | |
| 2008/0077825 A1 | 3/2008 | Bello et al. | |
| 2008/0162674 A1 | 7/2008 | Dahiya | |
| 2008/0195833 A1 | 8/2008 | Park | |
| 2008/0270678 A1 | 10/2008 | Cornwell et al. | |
| 2008/0282045 A1 | 11/2008 | Biswas et al. | |
| 2009/0077340 A1 | 3/2009 | Johnson et al. | |
| 2009/0100115 A1 | 4/2009 | Park et al. | |
| 2009/0113136 A1 | 4/2009 | Aharonov | |
| 2009/0198889 A1 | 8/2009 | Ito et al. | |
| 2010/0052625 A1 | 3/2010 | Cagno et al. | |
| 2010/0211723 A1 | 8/2010 | Mukaida | |
| 2010/0246266 A1 | 9/2010 | Park et al. | |
| 2010/0257142 A1 | 10/2010 | Murphy et al. | |
| 2010/0262764 A1 | 10/2010 | Liu et al. | |
| 2010/0325345 A1 | 12/2010 | Ohno et al. | |
| 2010/0332754 A1 | 12/2010 | Lai et al. | |
| 2011/0072290 A1 | 3/2011 | Davis et al. | |
| 2011/0119429 A1 | 5/2011 | Tu et al. | |
| 2011/0125955 A1 | 5/2011 | Chen | |
| 2011/0131231 A1 | 6/2011 | Haas et al. | |
| 2011/0167221 A1 | 7/2011 | Pangal et al. | |
| 2012/0023144 A1 | 1/2012 | Rub | |
| 2012/0054264 A1 | 3/2012 | Haugh et al. | |
| 2012/0079318 A1 | 3/2012 | Colgrove et al. | |
| 2012/0131253 A1 | 5/2012 | McKnight et al. | |
| 2012/0303919 A1 | 11/2012 | Hu et al. | |
| 2012/0311000 A1 | 12/2012 | Post et al. | |
| 2013/0007845 A1 | 1/2013 | Chang et al. | |
| 2013/0031414 A1 | 1/2013 | Dhuse et al. | |
| 2013/0036272 A1 | 2/2013 | Nelson | |
| 2013/0071087 A1 | 3/2013 | Motiwala et al. | |
| 2013/0145447 A1 | 6/2013 | Maron | |
| 2013/0191555 A1 | 7/2013 | Liu | |
| 2013/0198459 A1 | 8/2013 | Joshi et al. | |
| 2013/0205173 A1 | 8/2013 | Yoneda | |
| 2013/0219164 A1 | 8/2013 | Hamid | |
| 2013/0227201 A1 | 8/2013 | Talagala et al. | |
| 2013/0227209 A1 | 8/2013 | Czerkowicz et al. | |
| 2013/0290607 A1 | 10/2013 | Chang et al. | |
| 2013/0311434 A1 | 11/2013 | Jones | |
| 2013/0318297 A1 | 11/2013 | Jibbe et al. | |
| 2013/0332614 A1 | 12/2013 | Brunk et al. | |
| 2014/0020083 A1 | 1/2014 | Fetik | |
| 2014/0074850 A1 | 3/2014 | Noel et al. | |
| 2014/0082715 A1 | 3/2014 | Grajek et al. | |
| 2014/0086146 A1 | 3/2014 | Kim et al. | |
| 2014/0090009 A1 | 3/2014 | Li et al. | |
| 2014/0096220 A1 | 4/2014 | Pinto et al. | |
| 2014/0101434 A1 | 4/2014 | Senthurpandi et al. | |
| 2014/0164774 A1 | 6/2014 | Nord et al. | |
| 2014/0173232 A1 | 6/2014 | Reohr et al. | |

(56) References Cited

U.S. PATENT DOCUMENTS

| | | | |
|---|---|---|---|
| 2014/0188822 A1* | 7/2014 | Das | H03M 7/30 |
| | | | 707/693 |
| 2014/0195636 A1 | 7/2014 | Karve et al. | |
| 2014/0201512 A1 | 7/2014 | Seethaler et al. | |
| 2014/0201541 A1 | 7/2014 | Paul et al. | |
| 2014/0207743 A1 | 7/2014 | Quinn | |
| 2014/0208155 A1 | 7/2014 | Pan | |
| 2014/0215590 A1 | 7/2014 | Brand | |
| 2014/0229654 A1 | 8/2014 | Goss et al. | |
| 2014/0230017 A1 | 8/2014 | Saib | |
| 2014/0258526 A1 | 9/2014 | Le Sant et al. | |
| 2014/0282983 A1 | 9/2014 | Ju et al. | |
| 2014/0285917 A1 | 9/2014 | Cudak et al. | |
| 2014/0325262 A1 | 10/2014 | Cooper et al. | |
| 2014/0351627 A1 | 11/2014 | Best et al. | |
| 2014/0373104 A1 | 12/2014 | Gaddam et al. | |
| 2014/0373126 A1 | 12/2014 | Hussain et al. | |
| 2015/0019797 A1 | 1/2015 | Huang et al. | |
| 2015/0026387 A1 | 1/2015 | Sheredy et al. | |
| 2015/0074463 A1 | 3/2015 | Jacoby et al. | |
| 2015/0089569 A1 | 3/2015 | Sondhi et al. | |
| 2015/0095515 A1 | 4/2015 | Krithivas et al. | |
| 2015/0113203 A1 | 4/2015 | Dancho et al. | |
| 2015/0121137 A1 | 4/2015 | McKnight et al. | |
| 2015/0134920 A1 | 5/2015 | Anderson et al. | |
| 2015/0149822 A1 | 5/2015 | Coronado et al. | |
| 2015/0169665 A1 | 6/2015 | Sorenson, III | |
| 2015/0193169 A1 | 7/2015 | Sundaram et al. | |
| 2015/0339060 A1 | 11/2015 | Shin et al. | |
| 2015/0378888 A1 | 12/2015 | Zhang et al. | |
| 2016/0098323 A1 | 4/2016 | Mutha et al. | |
| 2016/0350009 A1 | 12/2016 | Cerreta et al. | |
| 2016/0352720 A1 | 12/2016 | Hu et al. | |
| 2016/0352830 A1 | 12/2016 | Borowiec et al. | |
| 2016/0352834 A1 | 12/2016 | Borowiec et al. | |
| 2018/0081562 A1 | 3/2018 | Vasudevan | |

FOREIGN PATENT DOCUMENTS

| | | |
|---|---|---|
| WO | 2013071087 A1 | 5/2013 |
| WO | 2014110137 A1 | 7/2014 |
| WO | 2016015008 A1 | 1/2016 |
| WO | 2016190938 A1 | 12/2016 |
| WO | 2016195759 A1 | 12/2016 |
| WO | 2016195958 A1 | 12/2016 |
| WO | 2016195961 A1 | 12/2016 |

OTHER PUBLICATIONS

ETSI, "Network Function Virtualisation (NFV); Resiliency Requirements", ETSI GS NFCV-REL 001, V1.1.1, Jan. 2015, 82 pages, etsi.org (online), URL: www.etsi.org/deliver/etsi_gs/NFV-REL/001_099/001/01.01.01_60/gs_NFV-REL001v010101p.pdf.

Faith, "dictzip file format", GitHub.com (online), accessed Jul. 28, 2015, 1 page, URL: github.com/fidlej/idzip.

Google Search of "storage array define" performed by the Examiner on Nov. 4, 2015 for U.S. Appl. No. 14/725,278, Results limited to entries dated before 2012, 1 page.

Hota et al., "Capability-based Cryptographic Data Access Control in Cloud Computing", International Journal of Advanced Networking and Applications, col. 1, Issue 1, Aug. 2011, 10 pages, Eswar Publications, India.

Hu et al., "Container Marking: Combining Data Placement, Garbage Collection and Wear Levelling for Flash", 19th Annual IEEE International Symposium on Modelling, Analysis, and Simulation of Computer and Telecommunications Systems, Jul. 25-27, 2011, 11 pages, ISBN: 978-0-7695-4430-4, DOI: 10.1109/MASCOTS.2011.50.

International Search Report and Written Opinion, PCT/US2016/015006, dated Apr. 29, 2016, 12 pages.
International Search Report and Written Opinion, PCT/US2016/015008, dated May 4, 2016, 12 pages.
International Search Report and Written Opinion, PCT/US2016/016333, dated Jun. 8, 2016, 12 pages.
International Search Report and Written Opinion, PCT/US2016/020410, dated Jul. 8, 2016, 12 pages.
International Search Report and Written Opinion, PCT/US2016/032052, dated Aug. 30, 2016, 17 pages.
International Search Report and Written Opinion, PCT/US2016/032084, dated Jul. 18, 2016, 12 pages.
International Search Report and Written Opinion, PCT/US2016/035492, dated Aug. 17, 2016, 10 pages.
International Search Report and Written Opinion, PCT/US2016/036693, dated Aug. 29, 2016, 10 pages.
International Search Report and Written Opinion, PCT/US2016/038758, dated Oct. 7, 2016, 10 pages.
International Search Report and Written Opinion, PCT/US2016/040393, dated Sep. 22, 2016, 10 pages.
International Search Report and Written Opinion, PCT/US2016/044020, dated Sep. 30, 2016, 11 pages.
International Search Report and Written Opinion, PCT/US2016/044874, dated Oct. 7, 2016, 11 pages.
International Search Report and Written Opinion, PCT/US2016/044875, dated Oct. 5, 2016, 13 pages.
International Search Report and Written Opinion, PCT/US2016/044876, dated Oct. 21, 2016, 12 pages.
International Search Report and Written Opinion, PCT/US2016/044877, dated Sep. 29, 2016, 13 pages.
Kong, "Using PCI Express as the Primary System Interconnect in Multiroot Compute, Storage, Communications and Embedded Systems", White Paper, IDT.com (online), Aug. 28, 2008, 12 pages, URL: www.idt.com/document/whp/idt-pcie-multi-root-white-paper.

Li et al., "Access Control for the Services Oriented Architecture", Proceedings of the 2007 ACM Workshop on Secure Web Services (SWS '07), Nov. 2007, pp. 9-17, ACM New York, NY.

Microsoft, "Hybrid for SharePoint Server 2013—Security Reference Architecture", Microsoft (online), Oct. 2014, 53 pages, URL: hybrid.office.com/img/Security_Reference_Architecture.pdf.

Microsoft, "Hybrid Identity Management", Microsoft (online), Apr. 2014, 2 pages, URL: download.microsoft.com/download/E/A/E/EAE57CD1-A80B-423C-96BB-142FAAC630B9/Hybrid_Identity_Datasheet.pdf.

Microsoft, "Hybrid Identity", Microsoft (online), Apr. 2014, 36 pages, URL: www.aka.ms/HybridIdentityWp.

PCmag, "Storage Array Definition", Published May 10, 2013, URL: http://web.archive.org/web/20130510121646/http://www.pcmag.com/encyclopedia/term/52091/storage-array, 2 pages.

Storer et al., "Secure Data Deduplication", Proceedings of the 4th ACM International Workshop on Storage Security and Survivability (StorageSS'08), Oct. 2008, 10 pages, ACM New York, NY. USA, DOI: 10.1145/1456469.1456471.

Sweere, "Creating Storage Class Persistent Memory with NVDIMM", Published in Aug. 2013, Flash Memory Summit 2013, URL: http://ww.flashmemorysummit.com/English/Collaterals/Proceedings/2013/20130814_T2_Sweere.pdf, 22 pages.

Techopedia, "What is a disk array", techopedia.com (online), Jan. 13, 2012, 1 page, URL: web.archive.org/web/20120113053358/http://www.techopedia.com/definition/1009/disk-array.

Webopedia, "What is a disk array", webopedia.com (online), May 26, 2011, 2 pages, URL: web/archive/web/20110526081214/http://www.webopedia.com/TERM/D/disk_array.html.

Wikipedia, "Convergent Encryption", Wikipedia.org (online), accessed Sep. 8, 2015, 2 pages, URL: en.wikipedia.org/wiki/Convergent_encryption.

* cited by examiner

DEDUPLICATING DATA BASED ON RECENTLY READING THE DATA

CROSS-REFERENCE TO RELATED APPLICATIONS

This is a continuation application for patent entitled to a filing date and claiming the benefit of earlier-filed U.S. patent application Ser. No. 16/892,221, filed Jun. 3, 2020, herein incorporated by reference in its entirety, which is a continuation application of U.S. Pat. No. 10,761,759, issued Sep. 1, 2020, which is a continuation of U.S. Pat. No. 9,594,678, issued Mar. 14, 2017.

TECHNICAL FIELD

The field of technology is data processing, or, more specifically, methods, apparatuses, and products for preventing duplicate entries of identical data in a storage device.

BACKGROUND ART

Data centers may include many computing components including servers, network devices, and storage arrays. Such storage arrays may include hard disk drives ('HDDs'), solid-state drives ('SSDs'), or other storage devices. To preserve the storage devices and more efficiently utilize the finite amount of storage in a storage array, data deduplication techniques may be implemented to eliminate duplicate copies of repeating data. Traditional data deduplication techniques, however, require large amounts of overhead in memory utilization and input/output ('I/O') operations.

SUMMARY OF INVENTION

Methods, apparatus, and products for preventing duplicate entries of identical data in a storage device, including: receiving a write request to write data to the storage device; calculating one or more signatures for the data associated with the write request; determining whether any of the calculated signatures match a calculated signature contained in a recently read signature buffer, each entry in the recently read signature buffer associating a calculated signature for data that has been read with an address of a storage location within the storage device where the data is stored; and responsive to determining that one of the calculated signatures matches a calculated signature contained in the recently read signature buffer, determining whether the data associated with the calculated signature is a duplicate of data stored at a particular address that is associated with the calculated signature contained in the recently read signature buffer.

The foregoing and other objects, features and advantages of the invention will be apparent from the following more particular descriptions of example embodiments of the invention as illustrated in the accompanying drawings wherein like reference numbers generally represent like parts of example embodiments of the invention.

DESCRIPTION OF EMBODIMENTS

Figure 1:
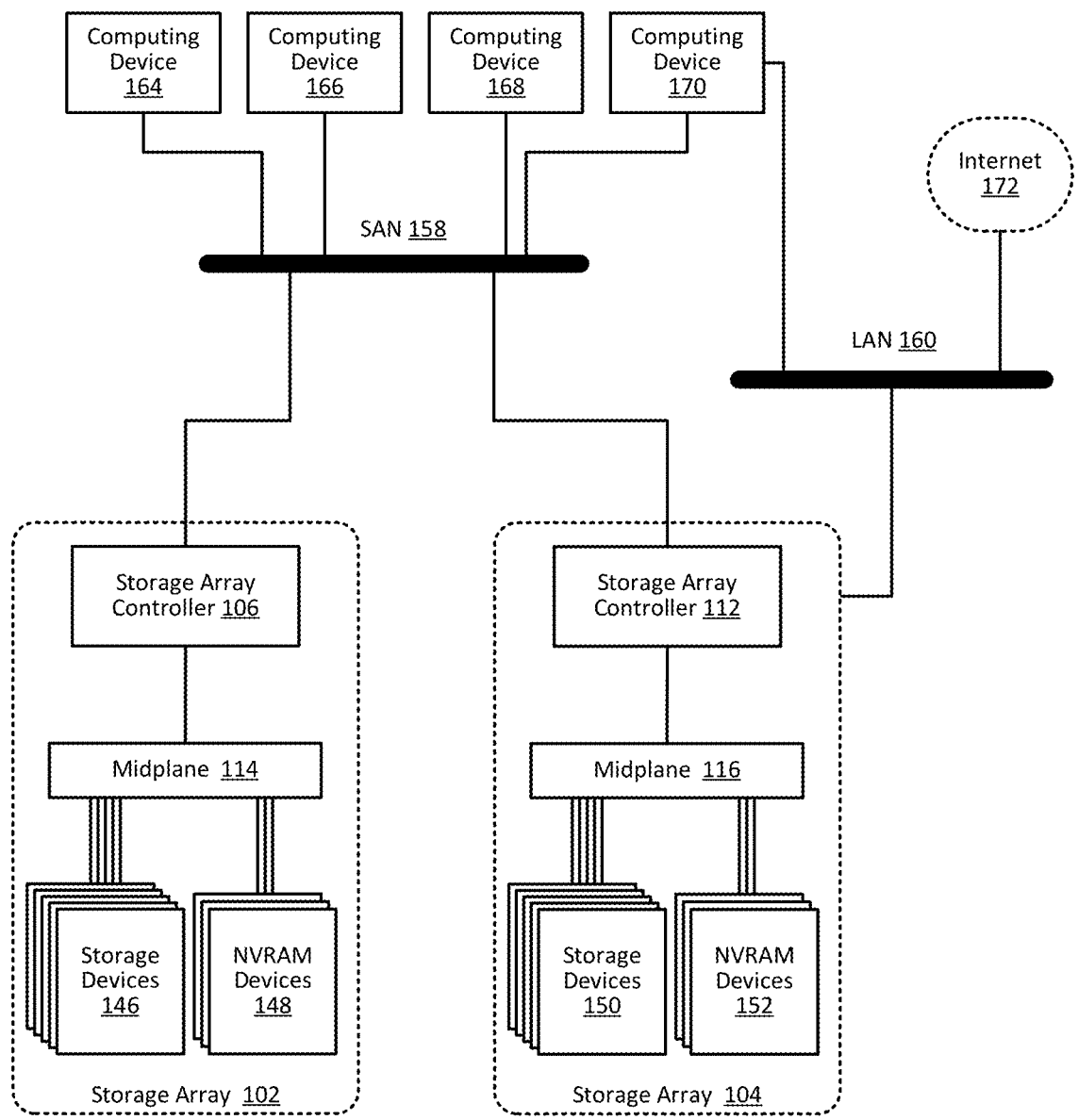
FIG. 1 sets forth a block diagram of an example system configured for preventing duplicate entries of identical data in a storage device according to embodiments of the present invention.

Example methods, apparatuses, and products for preventing duplicate entries of identical data in a storage device in accordance with the present invention are described with reference to the accompanying drawings, beginning with FIG. 1. FIG. 1 sets forth a block diagram of a system configured for preventing duplicate entries of identical data in a storage device according to embodiments of the present invention. The system of FIG. 1 includes a number of computing devices (164, 166, 168, 170). Such computing devices may be implemented in a number of different ways. For example, a computing device may be a server in a data center, a workstation, a personal computer, a notebook, or the like.

The computing devices (164, 166, 168, 170) in the example of FIG. 1 are coupled for data communications to a number of storage arrays (102, 104) through a storage area network ('SAN') (158) as well as a local area network (160) ('LAN'). The SAN (158) may be implemented with a variety of data communications fabrics, devices, and protocols. Example fabrics for such a SAN (158) may include Fibre Channel, Ethernet, Infiniband, Serial Attached Small Computer System Interface ('SAS'), and the like. Example data communications protocols for use in such a SAN (158) may include Advanced Technology Attachment ('ATA'), Fibre Channel Protocol, SCSI, iSCSI, HyperSCSI, and others. Readers of skill in the art will recognize that a SAN is just one among many possible data communications couplings which may be implemented between a computing device (164, 166, 168, 170) and a storage array (102, 104). For example, the storage devices (146, 150) within the storage arrays (102, 104) may also be coupled to the computing devices (164, 166, 168, 170) as network attached storage ('NAS') or object services capable of facilitating file-level or "object" access, or even using SAN-NAS and/or object hybrids that offer file-level, object, and/or block-level protocols from the same systems or to the same storage server. Any other such data communications coupling is well within the scope of embodiments of the present invention.

The local area network (160) of FIG. 1 may also be implemented with a variety of fabrics and protocols. Examples of such fabrics include Ethernet (802.3), wireless (802.11), and the like. Examples of such data communications protocols include Transmission Control Protocol ('TCP'), User Datagram Protocol ('UDP'), Internet Protocol ('IP'), HyperText Transfer Protocol ('HTTP'), Wireless Access Protocol ('WAP'), Handheld Device Transport Protocol ('HDTP'), Session Initiation Protocol ('SIP'), Real Time Protocol ('RTP') and others as will occur to those of skill in the art.

The example storage arrays (102, 104) of FIG. 1 provide persistent data storage for the computing devices (164, 166, 168, 170). Each storage array (102, 104) depicted in FIG. 1 includes a storage array controller (106, 112). Each storage array controller (106, 112) may be embodied as a module of automated computing machinery comprising computer hardware, computer software, or a combination of computer hardware and software. The storage array controllers (106, 112) may be configured to carry out various storage-related tasks. Such tasks may include writing data received from the one or more of the computing devices (164, 166, 168, 170) to storage, erasing data from storage, retrieving data from storage to provide the data to one or more of the computing devices (164, 166, 168, 170), monitoring and reporting of disk utilization and performance, performing RAID (Redundant Array of Independent Drives) or RAID-like data redundancy operations, compressing data, encrypting data, and so on.

Each storage array controller (106, 112) may be implemented in a variety of ways, including as a Field Programmable Gate Array ('FPGA'), a Programmable Logic Chip ('PLC'), an Application Specific Integrated Circuit ('ASIC'), or computing device that includes discrete components such as a central processing unit, computer memory, and various adapters. Each storage array controller (106, 112) may include, for example, a data communications adapter configured to support communications via the SAN (158) and the LAN (160). Although only one of the storage array controllers (112) in the example of FIG. 1 is depicted as being coupled to the LAN (160) for data communications, readers will appreciate that both storage array controllers (106, 112) may be independently coupled to the LAN (160). Each storage array controller (106, 112) may also include, for example, an I/O controller or the like that couples the storage array controller (106, 112) for data communications, through a midplane (114), to a number of storage devices (146, 150), and a number of non-volatile Random Access Memory ('NVRAM') devices (148, 152).

Each NVRAM device (148, 152) may be configured to receive, from the storage array controller (106, 112), data to be stored in the storage devices (146). Such data may originate from any one of the computing devices (164, 166, 168, 170). In the example of FIG. 1, writing data to the NVRAM device (148, 152) may be carried out more quickly than writing data to the storage device (146, 150). The storage array controller (106, 112) may be configured to effectively utilize the NVRAM devices (148, 152) as a quickly accessible buffer for data destined to be written to storage. In this way, the latency of write requests may be significantly improved relative to a system in which the storage array controller writes data directly to the storage devices (146, 150).

A 'storage device' as the term is used in this specification refers to any device configured to record data persistently. The term 'persistently' as used here refers to a device's ability to maintain recorded data after loss of a power source. Examples of storage devices may include mechanical, spinning hard disk drives, Solid-state drives (e.g., "Flash drives"), and the like.

The storage array controllers (106, 112) of FIG. 1 may be configured for preventing duplicate entries of identical data in a storage device according to embodiments of the present invention. The storage array controllers (106, 112) may prevent duplicate entries of identical data in a storage device by receiving a write request to write data to the storage device; calculating one or more signatures for the data associated with the write request; determining whether any of the calculated signatures match a calculated signature contained in a recently read signature buffer, each entry in the recently read signature buffer associating a calculated signature for data that has been read with an address of a storage location within the storage device where the data is stored; and responsive to determining that one of the calculated signatures matches a calculated signature contained in the recently read signature buffer, determining whether the data associated with the calculated signature is a duplicate of data stored at a particular address that is associated with the calculated signature contained in the recently read signature buffer, as will be described in greater detail below.

The arrangement of computing devices, storage arrays, networks, and other devices making up the example system illustrated in FIG. 1 are for explanation, not for limitation. Systems useful according to various embodiments of the present invention may include different configurations of servers, routers, switches, computing devices, and network architectures, not shown in FIG. 1, as will occur to those of skill in the art.

Preventing duplicate entries of identical data in a storage device in accordance with embodiments of the present invention is generally implemented with computers. In the system of FIG. 1, for example, all the computing devices (164, 166, 168, 170) and storage controllers (106, 112) may be implemented to some extent at least as computers. For further explanation, therefore, FIG. 2 sets forth a block diagram of a storage array controller (202) useful for preventing duplicate entries of identical data in a storage device according to embodiments of the present invention.

Figure 2:
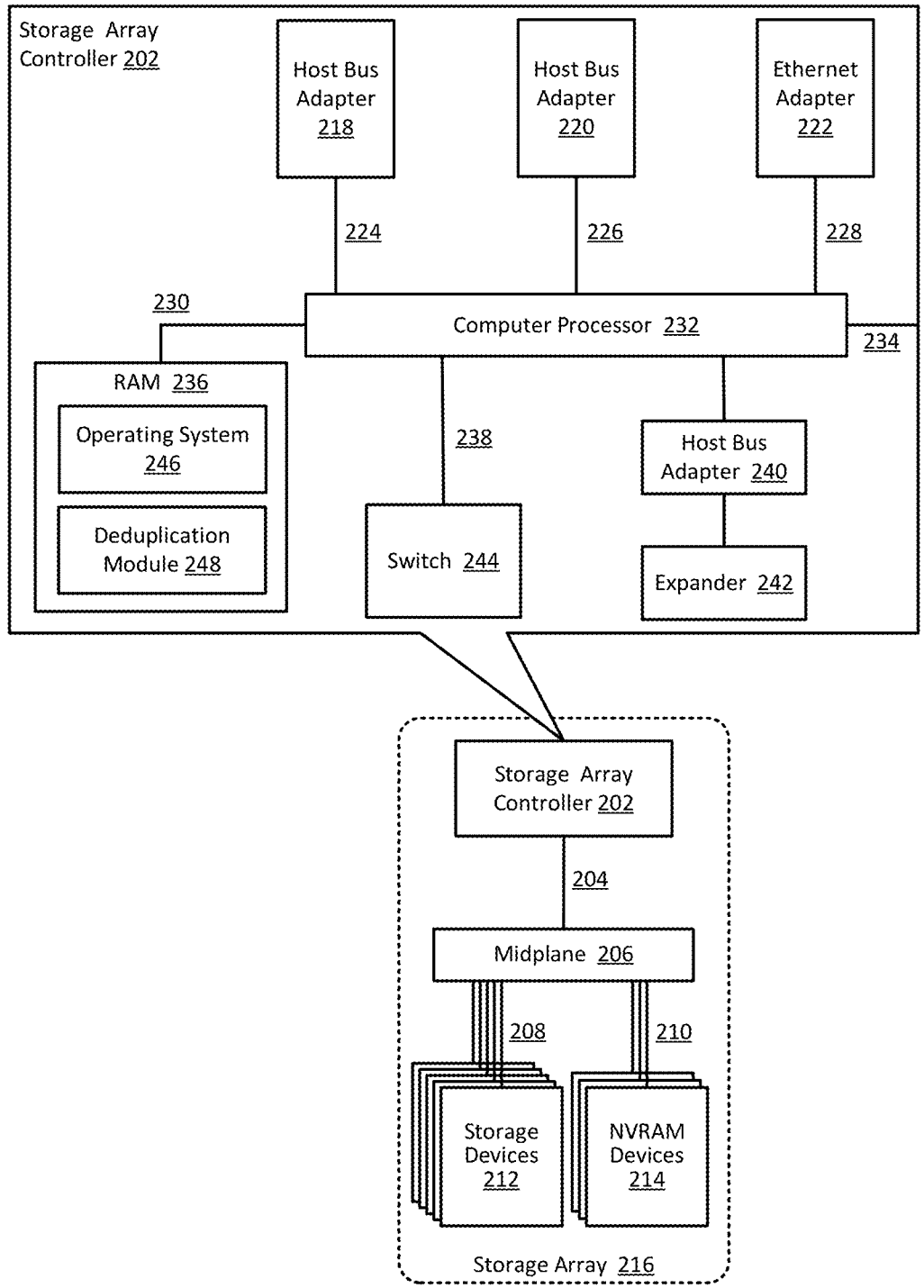
FIG. 2 sets forth a block diagram of an example storage array controller useful in preventing duplicate entries of identical data in a storage device according to embodiments of the present invention.

The storage array controller (202) of FIG. 2 is similar to the storage array controllers depicted in FIG. 1, as the storage array controller (202) of FIG. 2 is communicatively coupled, via a midplane (206), to one or more storage devices (212) and to one or more NVRAM devices (214) that are included as part of a storage array (216). The storage array controller (202) may be coupled to the midplane (206) via one or more data communications links (204) and the midplane (206) may be coupled to the storage devices (212) and the NVRAM devices (214) via one or more data communications links (208, 210). The data communications links (204, 208, 210) of FIG. 2 may be embodied, for example, as Peripheral Component Interconnect Express ('PCIe') bus.

The storage array controller (202) of FIG. 2 includes at least one computer processor (232) or 'CPU' as well as random access memory ('RAM') (236). The computer processor (232) may be connected to the RAM (236) via a data communications link (230), which may be embodied as a high speed memory bus such as a Double-Data Rate 4 ('DDR4') bus.

Stored in RAM (214) is an operating system (246). Examples of operating systems useful in storage array controllers (202) configured for preventing duplicate entries of identical data in a storage device according to embodiments of the present invention include UNIX™, Linux™, Microsoft Windows™, and others as will occur to those of skill in the art. Also stored in RAM (236) is an array management module (248), a module that includes computer program instructions for preventing duplicate entries of identical data in a storage device according to embodiments of the present invention. The functionality of the array management module (248) will be described in greater detail below, but readers will appreciate that while the array management module (248) and the operating system (246) in the example of FIG. 2 are shown in RAM (168), many components of such software may also be stored in non-volatile memory such as, for example, on a disk drive, on a solid-state drive, and so on.

The storage array controller (202) of FIG. 2 also includes a plurality of host bus adapters (218, 220, 222) that are coupled to the processor (232) via a data communications link (224, 226, 228). Each host bus adapter (218, 220, 222) may be embodied as a module of computer hardware that connects the host system (i.e., the storage array controller) to other network and storage devices. Each of the host bus adapters (218, 220, 222) of FIG. 2 may be embodied, for example, as a Fibre Channel adapter that enables the storage array controller (202) to connect to a SAN, as an Ethernet adapter that enables the storage array controller (202) to connect to a LAN, and so on. Each of the host bus adapters (218, 220, 222) may be coupled to the computer processor (232) via a data communications link (224, 226, 228) such as, for example, a PCIe bus.

The storage array controller (202) of FIG. 2 also includes a host bus adapter (240) that is coupled to an expander (242). The expander (242) depicted in FIG. 2 may be embodied as a module of computer hardware utilized to attach a host system to a larger number of storage devices than would be possible without the expander (242). The expander (242) depicted in FIG. 2 may be embodied, for example, as a SAS expander utilized to enable the host bus adapter (240) to attach to storage devices in an embodiment where the host bus adapter (240) is embodied as a SAS controller.

The storage array controller (202) of FIG. 2 also includes a switch (244) that is coupled to the computer processor (232) via a data communications link (238). The switch (244) of FIG. 2 may be embodied as a computer hardware device that can create multiple endpoints out of a single endpoint, thereby enabling multiple devices to share what was initially a single endpoint. The switch (244) of FIG. 2 may be embodied, for example, as a PCIe switch that is coupled to a PCIe bus (238) and presents multiple PCIe connection points to the midplane (206).

The storage array controller (202) of FIG. 2 also includes a data communications link (234) for coupling the storage array controller (202) to other storage array controllers. Such a data communications link (234) may be embodied, for example, as a QuickPath Interconnect ('QPI') interconnect.

Readers will recognize that these components, protocols, adapters, and architectures are for illustration only, not limitation. Such a storage array controller may be implemented in a variety of different ways, each of which is well within the scope of the present invention.

Figure 3:
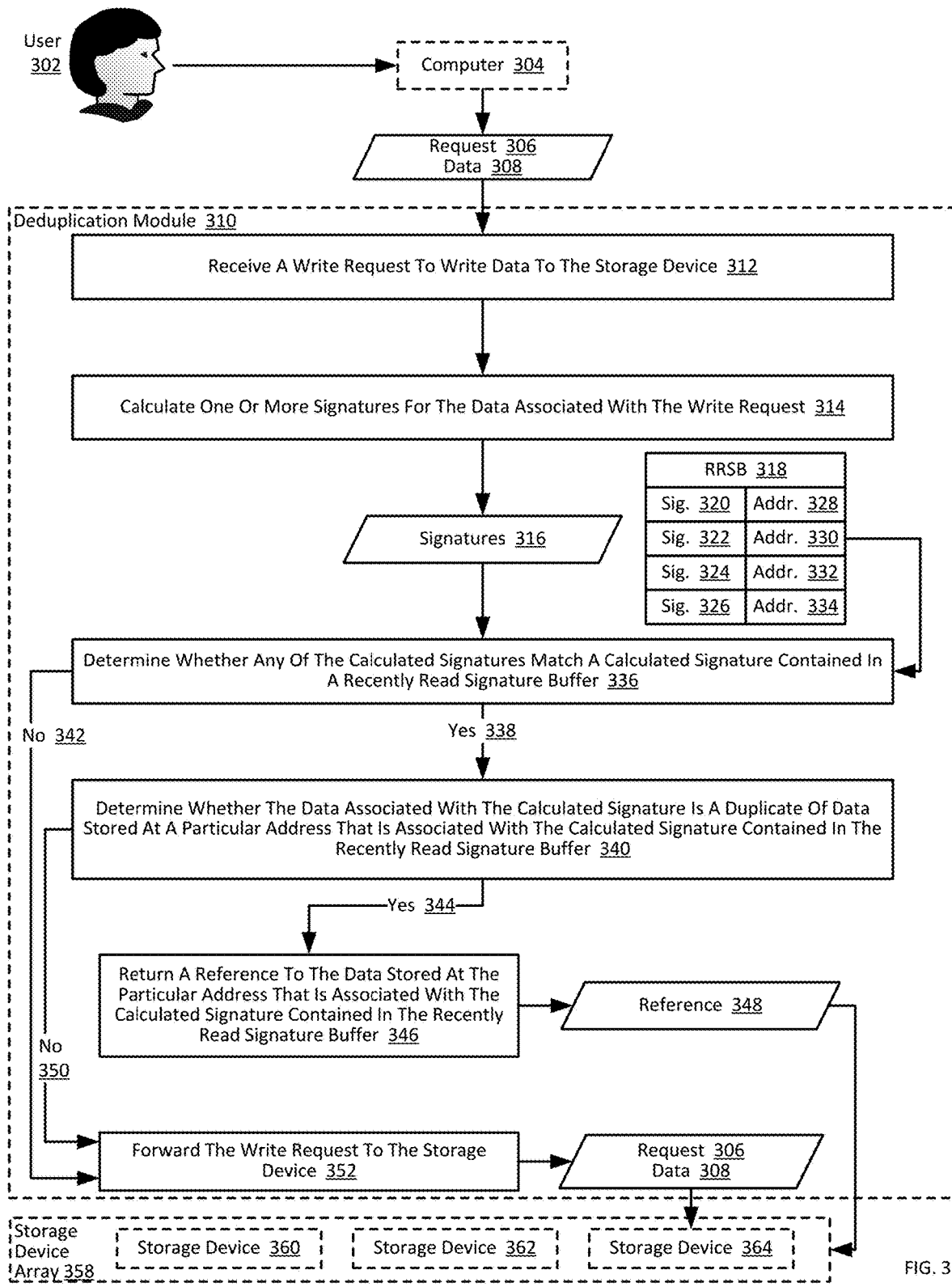
FIG. 3 sets forth a flow chart illustrating an example method for preventing duplicate entries of identical data in a storage device according to embodiments of the present invention.

For further explanation, FIG. 3 sets forth a flow chart illustrating an example method for preventing duplicate entries of identical data in a storage device (360, 362, 364) according to embodiments of the present invention. The storage devices (360, 362, 364) depicted in FIG. 3 may be embodied, for example, as SSDs that are included in an array of storage devices, depicted in FIG. 3 as a storage device array (358).

The example method depicted in FIG. 3 is carried out, at least in part, by a deduplication module (310). The deduplication module (310) depicted in FIG. 3 may be embodied, for example, as a module of computer program instructions executing on computer hardware such as a computer processor. The deduplication module (310) depicted in FIG. 3 may reside in memory that is contained in a storage array controller that is similar to the storage array controller described above with reference to FIG. 2.

The example method depicted in FIG. 3 includes receiving (312) a write request (306) to write data (308) to one or more of the storage devices (360, 362, 364) in an array (358) of storage devices. The write request (306) of FIG. 3 may be embodied, for example, as one or more messages received by a storage array controller that is executing the deduplication module (310). The one or more messages may include, for example, a first message to initiate the write process and one or more subsequent messages that include the data, all of which may be received by the storage array controller over a data communications network such as a SAN, a LAN, or any other data communications link. The write request (306) of FIG. 3 may include, for example, an identification of a device, file, object, other service to which the write request (306) is issued, an identification of a user or server that issued the write request (306), the data (308) that is to be written to the one or more of the storage devices (360, 362, 364), a reference to the data (308) that is to be written to the one or more of the storage devices (360, 362, 364), and any other information needed to service the write request (306).

The example method depicted in FIG. 3 also includes calculating (314) one or more signatures (316) for the data (308) associated with the write request (306). The one or more signatures (316) for the data (308) associated with the write request (306) represent identifiers of the data (308) that can be used to distinguish dissimilar data. Such a signature (316) may be embodied, for example, as a numeric value generated by applying a predetermined hash function to the data (308). Calculating (314) one or more signatures (316) for the data (308) associated with the write request (306) may therefore be carried out by applying one or more predetermined hash functions to the data (308) associated with the write request (306). That is, calculating (314) one or more signatures (316) for the data (308) associated with the write request (306) may be carried out by utilizing the data (308) as input to one or more predetermined hash functions, where the output of each hash function is a signature (316) for the data (308).

Readers will appreciate that multiple signatures (316) for the data (308) may be generated not only by applying multiple hash functions to the same data (308), but multiple signatures (316) for the data (308) may also be generated by applying one or more hash functions to different portions of the data (308). Consider an example in which the data (308) includes 4 kilobytes ('KBs'). In such an example, a hash function may be applied to all 4 KBs to generate a first signature, a hash function may be applied to the first 512 bytes only to generate a second signature, a hash function may be applied to the last 512 bytes only to generate a third signature, a hash function may be applied to a middle 512 bytes only to generate a fourth signature, and so on. Readers will appreciate that the decision to apply multiple hash functions to data, to segment the data into a plurality of portions (which may or may not overlap), or any combination thereof are all design decisions that are well within the scope of the present disclosure.

The example method depicted in FIG. 3 also includes determining (336) whether any of the calculated signatures (316) match a calculated signature (320, 322, 324, 326) contained in a recently read signature buffer (318). The recently read signature buffer (318) of FIG. 3 represents a data structure that associates a calculated signature (320, 322, 324, 326) for data that has been read with an address (328, 330, 332, 334) of a storage location within the storage device where the data is stored. As will be described in greater detail below, each time that a particular storage array controller reads data from a storage device (360, 362, 364), a deduplication module (310) executing on the storage array controller may calculate one or more signatures for the data read from a storage device (360, 362, 364) by applying the one or more predetermined hash functions referenced above to the data read from a storage device (360, 362, 364). Alternatively, in an embodiment where the storage device (360, 362, 364) calculates and stores one or more signatures for data stored by the storage devices (360, 362, 364), the deduplication module (310) executing on the storage array controller may retrieve the one or more signatures from the storage device (360, 362, 364) when the data is read from the storage device (360, 362, 364). Each of the one or more signatures for the data read from the storage device (360, 362, 364) may be stored in the recently read signature buffer (318) along with the address in the storage device (360, 362, 364) where the data is stored.

In the example method depicted in FIG. 3, determining (336) whether any of the calculated signatures (316) match a calculated signature (320, 322, 324, 326) contained in a recently read signature buffer (318) may be carried out, for example, by comparing the calculated signatures (316) for the data (308) associated with the write request (306) to each calculated signature (320, 322, 324, 326) contained in the recently read signature buffer (318). If the deduplication module (310) determines that the calculated signatures (316) for the data (308) associated with the write request (306) do not (342) match any of the a calculated signature (320, 322, 324, 326) contained in a recently read signature buffer (318), the deduplication module (310) can safely determine that the data (308) associated with the write request (306) is not a duplicate of any data that was recently read and whose signature was retained in the recently read signature buffer (318). If the deduplication module (310) determines that the calculated signatures (316) for the data (308) associated with the write request (306) does (338) match one or more of the calculated signatures (320, 322, 324, 326) contained in a recently read signature buffer (318), however, the deduplication module (310) can determine that the data (308) associated with the write request (306) may already be stored on the storage device (360, 362, 364).

If the deduplication module (310) determines that the calculated signatures (316) for the data (308) associated with the write request (306) does (338) match one or more of the a calculated signatures (320, 322, 324, 326) contained in a recently read signature buffer (318), the deduplication module (310) can determine (340) whether the data (308) associated with the calculated signature (316) is a duplicate of data stored at a particular address (328, 330, 332, 334) that is associated with the calculated signature (320, 322, 324, 326) contained in the recently read signature buffer (318). Determining (340) whether the data (308) associated with the calculated signature (316) is a duplicate of data stored at a particular address (328, 330, 332, 334) that is associated with the calculated signature (320, 322, 324, 326) contained in the recently read signature buffer (318) may be carried out, for example, by obtaining the data that is stored at the particular address (328, 330, 332, 334) that is associated with the calculated signature (320, 322, 324, 326) contained in the recently read signature buffer (318) and performing a bit-by-bit comparison of the retrieved data to the data (308) associated with the calculated signature (316).

Determining (340) whether the data (308) associated with the calculated signature (316) is a duplicate of data stored at a particular address (328, 330, 332, 334) that is associated with the calculated signature (320, 322, 324, 326) contained in the recently read signature buffer (318) can be carried out in response to affirmatively (338) determining that one of the calculated signatures (316) matches a calculated signature (320, 322, 324, 326) contained in the recently read signature buffer (318). Readers will appreciate that affirmatively (338) determining that one of the calculated signatures (316) matches a calculated signature (320, 322, 324, 326) contained in the recently read signature buffer (318) may only be indicative that the data (308) associated with the calculated signature (316) may be a duplicate of data stored at a particular address (328, 330, 332, 334) that is associated with the calculated signature (320, 322, 324, 326) contained in the recently read signature buffer (318). For example, if a particular hash function is used that is relatively weak, but relatively quick to perform, collisions may occur where distinct data results in the same hash value. As such, in order to definitively determine whether the data (308) associated with the calculated signature (316) is a duplicate of data stored at a particular address (328, 330, 332, 334) that is associated with the calculated signature (320, 322, 324, 326) contained in the recently read signature buffer (318), the data (308) associated with the calculated signature (316) and the data stored at a particular address (328, 330, 332, 334) that is associated with the calculated signature (320, 322, 324, 326) contained in the recently read signature buffer (318) must actually be compared.

In response to affirmatively (344) determining that the data (308) associated with the write request (306) is a duplicate of data stored at a particular address (328, 330, 332, 334) that is associated with the calculated signature (320, 322, 324, 326) contained in the recently read signature buffer (318), a reference (348) to the particular address (328, 330, 332, 334) is returned. The reference (348) to the particular address (328, 330, 332, 334) where data is stored that is a duplicate of the data (308) associated with the write request (306) may be embodied, for example, as a pointer to the particular address (328, 330, 332, 334) where data is stored that is a duplicate of the data (308) associated with the write request (306), as the particular address (328, 330, 332, 334) itself where data is stored that is a duplicate of the data (308) associated with the write request (306), and so on. In the example method depicted in FIG. 3, returning a reference (348) to the particular address (328, 330, 332, 334) can include storing the reference (348) to the particular address (328, 330, 332, 334) at a memory location where the data (308) associated with the write request (306) would have been stored, if not for the fact that a duplicate copy of the data (308) associated with the write request (306) was already stored in the storage device (360, 362, 364).

In response to determining that the data (308) associated with the write request (306) is not (350) a duplicate of data stored at a particular address (328, 330, 332, 334) that is associated with the calculated signature (320, 322, 324, 326) contained in the recently read signature buffer (318), the write request (306) is forwarded (352) to the storage device (360, 362, 364). The write request (306) may be forwarded (352) to the storage device (360, 362, 364) so that the storage device (360, 362, 364) can service the write request (306). Readers will appreciate that forwarding (352) the write request (306) to the storage device (360, 362, 364) does not necessarily result in the data (308) associated with the write request (306) being written to the storage device (360, 362, 364). The data (308) associated with the write request (306) may not ultimately be written to the storage device (360, 362, 364) because a controller or other form of computer logic may determine that some data, already stored in the storage device (360, 362, 364) but not reflected in the recently read signature buffer (318), matches the data (308) associated with the write request (306). Readers will further appreciate that the data (308) associated with the write request (306) may undergo further processing prior to forwarding (352) the write request (306) to the storage device (360, 362, 364). For example, the data (308) associated with the write request (306) may be compressed, encrypted, or otherwise processed according to various design decisions that are each within the scope of the present disclosure.

Although the example described above makes reference to preventing duplicate entries of identical data in a storage device (360, 362, 364), readers will appreciate that the steps described above can be applied to a single storage device and also applied to multiple storage devices, such as all of the storage devices (360, 362, 364) in the storage device array (358). Preventing duplicate entries of identical data across all storage devices (360, 362, 364) in the storage device array (358) may be carried out, for example, through the use of an addressing scheme where the addresses in each storage device (360, 362, 364) are unique, by associating a device identifier with the addresses (328, 330, 332, 334) stored in the recently read signature buffer (318) if the addresses in each storage device are not unique, and so on. Because the deduplication module (310) may reside on a storage array controller that facilitates accesses to all storage devices (360, 362, 364) in the storage device array (358), the deduplication module (310) may be configured to maintain a recently read signature buffer (318) that includes information describing data read from all storage devices (360, 362, 364) in the storage device array (358). In the event that redundant storage array controllers facilitate accesses to all storage devices (360, 362, 364) in the storage device array (358), the storage array controllers may be configured to communicate with each other to maintain a recently read signature buffer (318) that includes information describing data read from all storage devices (360, 362, 364) in the storage device array (358).

Figure 4:
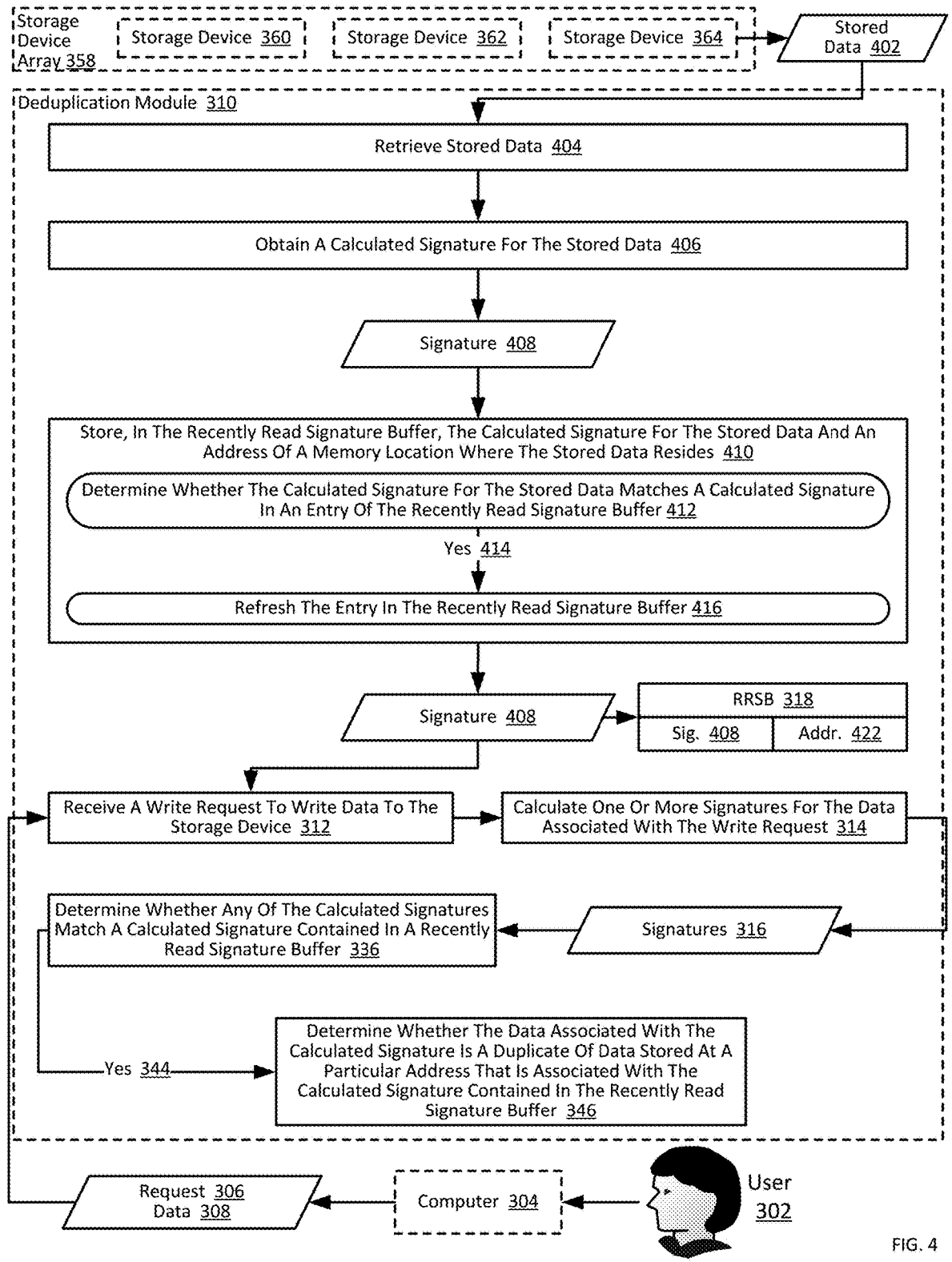
FIG. 4 sets forth a flow chart illustrating an additional example method for preventing duplicate entries of identical data in a storage device according to embodiments of the present invention.

For further explanation, FIG. 4 sets forth a flow chart illustrating an example method for preventing duplicate entries of identical data in a storage device according to embodiments of the present invention. The example method depicted in FIG. 4 is similar to the example method depicted in FIG. 3, as the example method depicted in FIG. 4 also includes receiving (312) a write request (306) to write data (308) to one or more of the storage devices (360, 362, 364) in an array (358) of storage devices, calculating (314) one or more signatures (316) for the data (308) associated with the write request (306), determining (336) whether any of the calculated signatures (316) match a calculated signature (408) contained in a recently read signature buffer (318), and determining (340) whether the data (308) associated with the calculated signature (316) is a duplicate of data stored at a particular address (422) that is associated with the calculated signature (408) contained in the recently read signature buffer (318).

The example method depicted in FIG. 4 also includes retrieving (404) stored data (402). The stored data (402) may be retrieved (404), for example, from one of the storage devices (360, 362, 364) in the array (358) of storage devices in response to a read request receive by a storage array controller. Such a read request may include an identifier of the stored data (402) such as a file name, an address for the stored data (402), information identifying the user, computer, other entity, or logical, virtual, or physical storage device that issued the read request, or any other information needed to service the read request.

The example method depicted in FIG. 4 also includes obtaining (406) a calculated signature (408) for the stored data (402). Obtaining (406) a calculated signature (408) for the stored data (402) may be carried out, for example, by applying a predetermined hash function to the stored data (402). In such a way, the deduplication module (310) may calculate the signature (408) for the stored data (402). In an alternative embodiment, the signature (408) may be calculated by a storage array controller, by processing logic on one of the storage devices (360, 362, 364), or by some other entity, and stored in the storage device (360, 362, 364) along with the stored data (402) itself. In such an alternative embodiment, the calculated signature (408) for the stored data (402) may be obtained (406) by retrieving the calculated signature (408) for the stored data (402) from one of the storage devices (360, 362, 364) as part of retrieving (404) the stored data (402), and so on.

The example method depicted in FIG. 4 also includes storing (410), in the recently read signature buffer (318), the calculated signature (408) for the stored data (402) and an address (422) of a storage location on the storage device (360, 362, 364) where the stored data (402) resides. Storing (410) the calculated signature (408) for the stored data (402) and an address (422) of a storage location on the storage device (360, 362, 364) where the stored data (402) resides may be carried out, for example, by: removing an entry from the recently read signature buffer (318) and replacing the removed entry with the calculated signature (408) for the stored data (402) and the address (422) for the stored data (402); identifying an empty or outdated entry in the recently read signature buffer (318) and replacing the empty or outdated entry with the calculated signature (408) for the stored data (402) and the address (422) for the stored data (402); and in other ways as will occur to readers of skill in the art. Readers will appreciate that each time that stored data (402) is read from one of the storage devices (360, 362, 364), the calculated signature (408) and the address (422) for the stored data (402) may be stored (410) in the recently read signature buffer (318) such that entries in the recently read signature buffer (318) remain current. Readers will further appreciate the calculated signature (408) and the address (422) for the stored data (402) may be stored (410) in the recently read signature buffer (318) for only a subset of the times that stored data (402) is read from one of the storage devices (360, 362, 364) in accordance with embodiments described herein.

In the example method depicted in FIG. 4, storing (410) the calculated signature (408) for the stored data (402) and the address (422) of the stored data (402) in the recently read signature buffer (318) can include determining (412) whether the calculated signature (408) for the stored data (402) matches a calculated signature in an entry of the recently read signature buffer (318). In order to avoid creating duplicate entries in the recently read signature buffer (318), the deduplication module (310) may determine (412) whether the calculated signature (408) for the stored data (402) matches a calculated signature in an entry of the recently read signature buffer (318).

In response to affirmatively (414) determining that the calculated signature (408) for the stored data (402) matches calculated signature in an entry of the recently read signature buffer (318), the entry in the recently read signature buffer (318) may be refreshed (416). Refreshing (416) the entry in the recently read signature buffer (318) that matches the calculated signature (408) for the stored data (402) may be carried out, for example, by updating a timestamp identifying the time at which the stored data (402) was retrieved (404) in response to a read request. In an alternative embodiment where the recently read signature buffer (318) is sorted, for example, such that older entries appear at the front of the recently read signature buffer (318) and newer entries appear at the back recently read signature buffer (318), refreshing (416) the entry in the recently read signature buffer (318) that matches the calculated signature (408) for the stored data (402) may be carried out by moving the entry to a location within the recently read signature buffer (318) that is designated for newer entries. Readers will appreciate that the recently read signature buffer (318) may be organized in other ways and that refreshing (416) the entry in the recently read signature buffer (318) that matches the calculated signature (408) for the stored data (402) may be carried in accordance with any corresponding organization policy. Furthermore, refreshing (416) the entry in the recently read signature buffer (318) that matches the calculated signature (408) for the stored data (402) might only be carried out for a subset of situations in which the calculated signature (408) for the stored data (402) is affirmatively (414) determined to match a calculated signature in an entry of the recently read signature buffer (318), as retaining the original signature may be preferable in certain circumstances.

Figure 5:
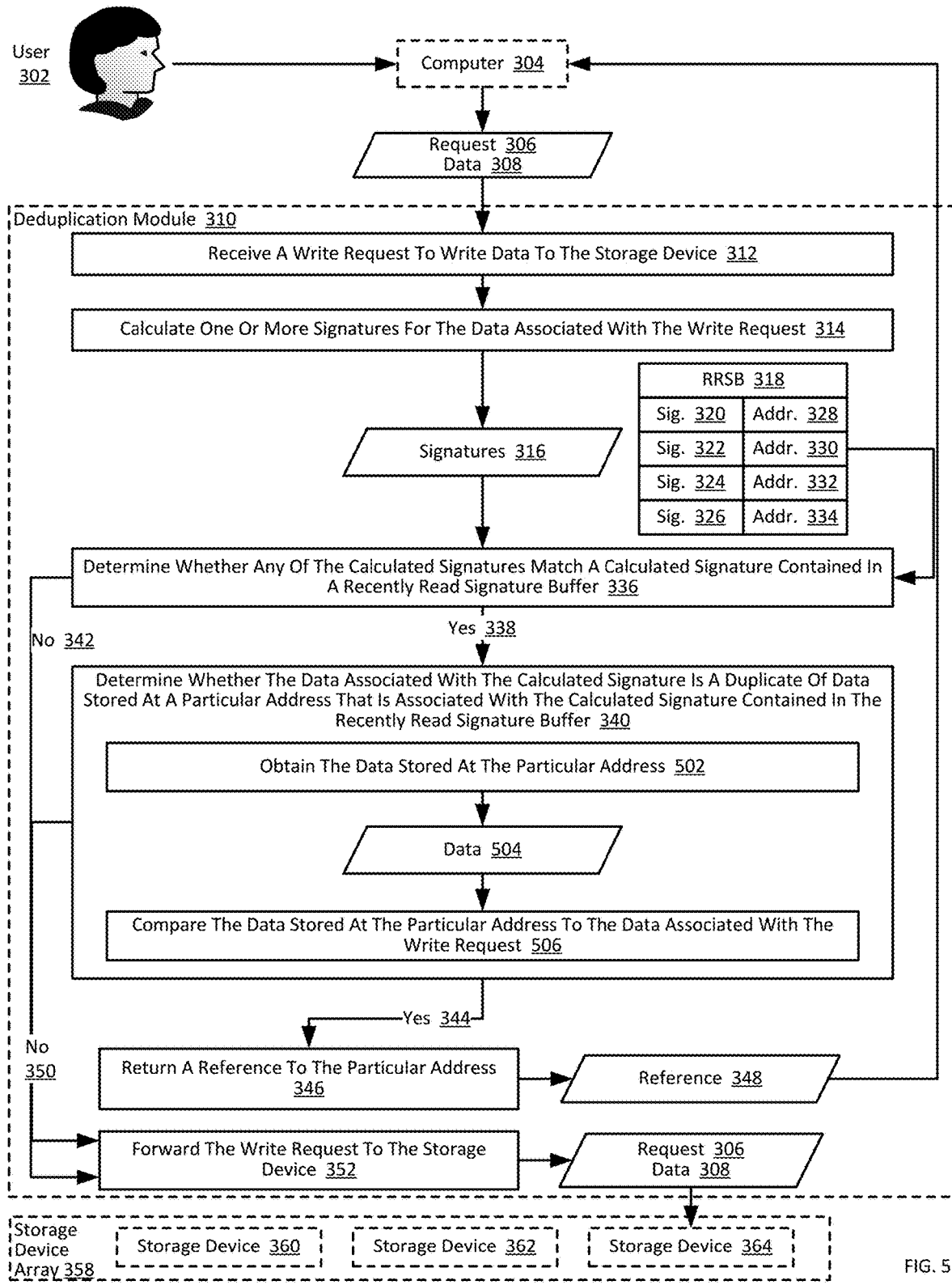
FIG. 5 sets forth a flow chart illustrating an additional example method for preventing duplicate entries of identical data in a storage device according to embodiments of the present invention.

For further explanation, FIG. 5 sets forth a flow chart illustrating an example method for preventing duplicate entries of identical data in a storage device according to embodiments of the present invention. The example method depicted in FIG. 5 is similar to the example method depicted in FIG. 3, as the example method depicted in FIG. 5 also includes receiving (312) a write request (306) to write data (308) to one or more of the storage devices (360, 362, 364) in an array (358) of storage devices, calculating (314) one or more signatures (316) for the data (308) associated with the write request (306), determining (336) whether any of the calculated signatures (316) match a calculated signature (320, 322, 324, 326) contained in a recently read signature buffer (318), and determining (340) whether the data (308) associated with the calculated signature (316) is a duplicate of data stored at a particular address (328, 330, 332, 334) that is associated with the calculated signature (320, 322, 324, 326) contained in the recently read signature buffer (318).

In the example method depicted in FIG. 5, determining (340) whether the data (308) associated with the calculated signature (316) is a duplicate of data stored at a particular address (328, 330, 332, 334) that is associated with the calculated signature (320, 322, 324, 326) contained in the recently read signature buffer (318) can include obtaining (502) the data (504) stored at the particular address (328, 330, 332, 334). Obtaining (502) the data (504) stored at the particular address (328, 330, 332, 334) may be carried out, for example, by reading the data (504) from the storage device (360, 362, 364) using the particular address (328, 330, 332, 334). In an alternative embodiment, a cache may exist to temporarily store data that is read from one of the storage devices and associated with an entry in the recently read signature buffer (318). For example, the first entry in the recently read signature buffer (318) of FIG. 1 includes a signature (320) for recently read data and the address (328) at which the recently read data is stored. In such an example, the recently read data itself may be stored in the cache, such that obtaining (502) the data (504) stored at the particular address (328) may be carried out by retrieving the data (504) from the cache.

In the example method depicted in FIG. 5, determining (340) whether the data (308) associated with the calculated signature (316) is a duplicate of data stored at a particular address (328, 330, 332, 334) that is associated with the calculated signature (320, 322, 324, 326) contained in the recently read signature buffer (318) can also include comparing (506) the data (504) stored at the particular address (328, 330, 332, 334) to the data (308) associated with the write request (306). By performing an actual comparison (506) of the data (504) stored at the particular address (328, 330, 332, 334) to the data (308) associated with the write request (306), a definitive determination can be made as to whether the data (504) stored at the particular address (328, 330, 332, 334) and the data (308) associated with the write request (306) are duplicates. Readers will appreciate that the mere fact that the signature for the data (504) stored at the particular address (328, 330, 332, 334) matches the signature for the data (308) associated with the write request (306), does not necessarily mean that the data (504) stored at the particular address (328, 330, 332, 334) is a duplicate of the data (308) associated with the write request (306). That is, matching signatures may occasionally be generated from dissimilar data as some hash functions may occasionally result in collisions. The strength of a hash function may be increased to reduce or eliminate such collisions, but a design decision may be made to utilize a weaker hash function which requires less time and computing resources to apply. Furthermore, a weaker hash function may also result in a smaller hash value, thereby requiring less space to store and enabling more signatures to be stored in a given space, relative to a stronger hash function. With all hash functions, however, applying the same hash function to identical data will produce the same signatures.

Figure 6:
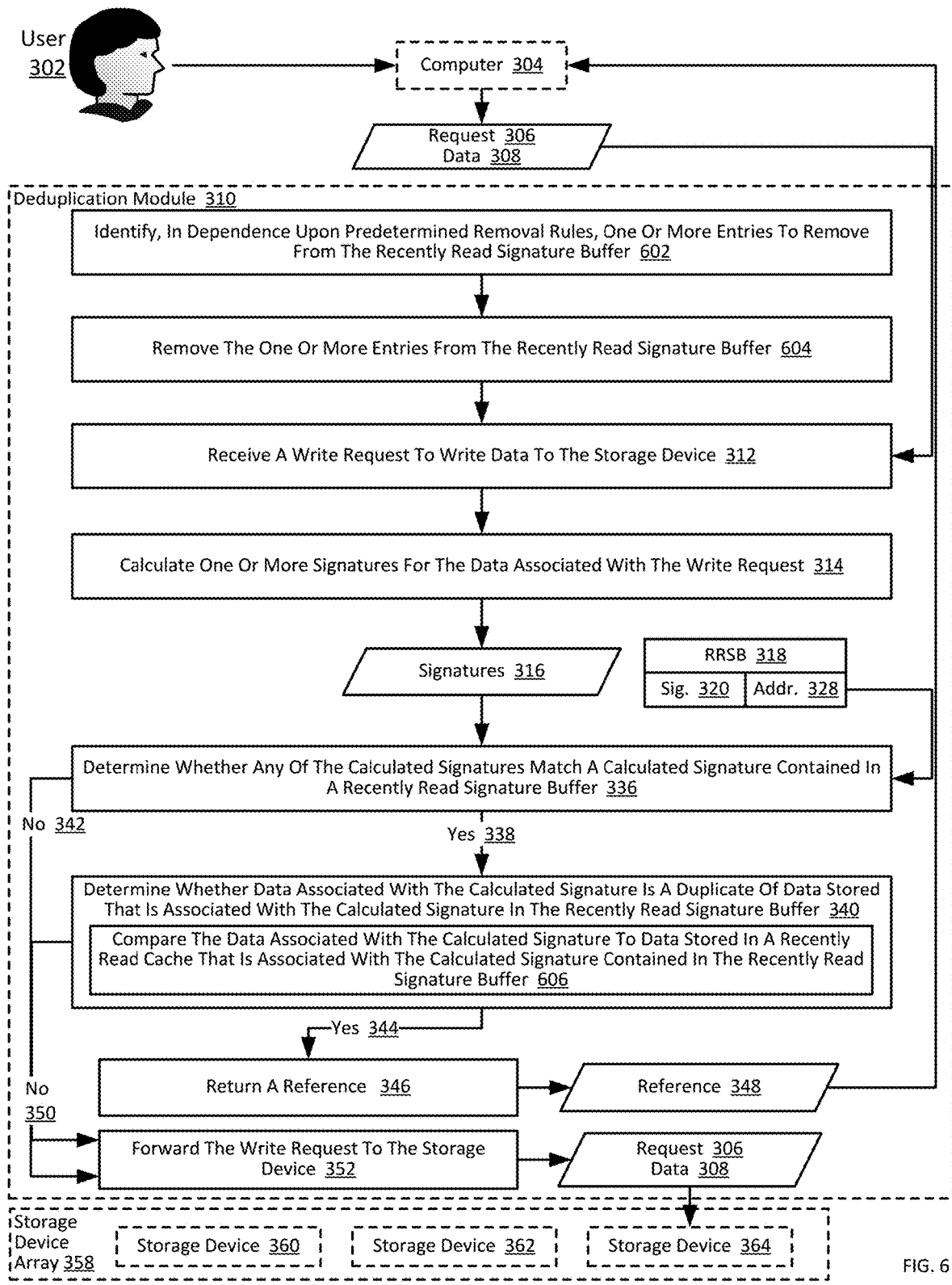
FIG. 6 sets forth a flow chart illustrating an additional example method for preventing duplicate entries of identical data in a storage device according to embodiments of the present invention.

For further explanation, FIG. 6 sets forth a flow chart illustrating an example method for preventing duplicate entries of identical data in a storage device according to embodiments of the present invention. The example method depicted in FIG. 6 is similar to the example method depicted in FIG. 3, as the example method depicted in FIG. 6 also includes receiving (312) a write request (306) to write data (308) to one or more of the storage devices (360, 362, 364) in an array (358) of storage devices, calculating (314) one or more signatures (316) for the data (308) associated with the write request (306), determining (336) whether any of the calculated signatures (316) match a calculated signature (320) contained in a recently read signature buffer (318), and determining (340) whether the data (308) associated with the calculated signature (316) is a duplicate of data stored at a particular address (328) that is associated with the calculated signature (320) contained in the recently read signature buffer (318).

The example method depicted in FIG. 6 also includes identifying (602), in dependence upon predetermined removal rules, one or more entries to remove from the recently read signature buffer (318). The predetermined removal rules may specify a removal policy for the recently read signature buffer (318) such as a policy to remove an entry in the recently read signature buffer (318) that is associated with the least recently read data, or a policy to remove an entry in the recently read signature buffer (318) that includes an address (328) that has been written to since being added to the recently read signature buffer (318), and so on. Readers will appreciate that predetermined removal rules may specify other removal policies and that identifying (602) one or more entries to remove from the recently read signature buffer (318) in accordance with such predetermined removal rules.

The example method depicted in FIG. 6 also includes removing (604) the one or more entries from the recently read signature buffer (318). Removing (604) the one or more entries from the recently read signature buffer (318) may be carried out, for example, by deleting the one or more entries from the recently read signature buffer (318), by overwriting the one or more entries from the recently read signature buffer (318) to include new entries, and so on.

In the example method depicted in FIG. 6, determining (340) whether the data (308) associated with the calculated signature (316) is a duplicate of data stored at a particular address (328) that is associated with the calculated signature (320) contained in the recently read signature buffer (318) can include comparing (606) the data associated with the calculated signature to data stored in a cache that is associated with information contained in the recently read signature buffer (318). The cache may be embodied, for example, as a general purpose cache that temporarily stores data that is read from one of the storage device and associated with an entry in the recently read signature buffer (318). In such an example, the recently read data itself may be stored in the cache, such that obtaining the data stored at the particular address (328) included in the recently read signature buffer (318) may be carried out by retrieving the data from the cache.

The example method depicted in FIG. 6 illustrates an embodiment where identifying (602) one or more entries to remove from the recently read signature buffer (318) and removing (604) the one or more entries from the recently read signature buffer (318) are included as part of a larger process that includes receiving (312) a write request (306), determining (336) whether any of the calculated signatures (316) match a calculated signature (320) contained in a recently read signature buffer (318), and determining (340) whether the data (308) associated with the calculated signature (316) is a duplicate of data stored at a particular address (328) that is associated with the calculated signature (320) contained in the recently read signature buffer (318). Readers will appreciate, however, that identifying (602) one or more entries to remove from the recently read signature buffer (318) and removing (604) the one or more entries from the recently read signature buffer (318) may be carried out as isolated steps whose occurrence is not contingent upon the occurrence of the remaining steps depicted in FIG. 6. In other words, entries may be removed from the recently read signature buffer (318) as part of an independent process, without immediately or even eventually receiving (312) a write request (306) and performing the remaining steps depicted in FIG. 6.

Example embodiments of the present invention are described largely in the context of a fully functional computer system. Readers of skill in the art will recognize, however, that the present invention also may be embodied in a computer program product disposed upon computer readable media for use with any suitable data processing system. Such computer readable storage media may be any transitory or non-transitory media. Examples of such media include storage media for machine-readable information, including magnetic media, optical media, or other suitable media. Examples of such media also include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the example embodiments described in this specification are oriented to software installed and executing on computer hardware, nevertheless, alternative embodiments implemented as firmware, as hardware, or as an aggregation of hardware and software are well within the scope of embodiments of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method implemented by a computing device comprising a processor and a memory device, the method comprising:
   determining, by the computing device, whether a calculated signature for write data within a received write request matches a particular signature corresponding to particular data that was read from a storage device prior to the write request; and
   based on a determination that the calculated signature for the write data matches the particular signature, comparing, by the computing device, the particular data to the write data.

2. The method of claim 1 further comprising:
   retrieving the data from one or more storage devices;
   obtaining a signature for the data; and
   storing, in a signature buffer, the signature for the data and an address of a storage location where the data resides.

3. The method of claim 2 wherein storing the signature for the data and an address of a storage location where the data resides includes:
   determining whether the signature for the data matches a signature in an entry of the signature buffer; and
   responsive to determining that the signature for the data matches the signature in the entry of the signature buffer, refreshing the entry in the signature buffer.

4. The method of claim 2 further comprising:
   identifying, in dependence upon predetermined removal rules, one or more entries to remove from the signature buffer; and
   removing the one or more entries from the signature buffer.

5. The method of claim 2 wherein determining whether the write data is a duplicate of the data stored at an address associated with the particular signature further comprises:
   obtaining the data stored at the address; and
   comparing the data stored at the address to the write data.

6. The method of claim 5 further comprising, responsive to determining that the write data is the duplicate of the data stored at the address, returning a reference to the address.

7. The method of claim 5 wherein determining whether the write data is a duplicate of the data stored at the address associated with the particular signature further comprises comparing the write data to data stored in a cache that is associated with information contained in the signature buffer.

8. An apparatus comprising a computer processor, a computer memory operatively coupled to the computer processor, the computer memory having disposed within it computer program instructions that, when executed by the computer processor, cause the apparatus to carry out the steps of:
   determining, by the apparatus, whether a calculated signature for write data within a received write request matches a particular signature corresponding to particular data that was read from a storage device prior to the write request, and based on a determination that the calculated signature for the write data matches the particular signature, comparing, by the apparatus, the particular data to the write data.

9. The apparatus of claim 8 further comprising computer program instructions that, when executed by the computer processor, cause the apparatus to carry out the steps of:
retrieving the data from one or more storage devices;
obtaining a signature for the data; and
storing, in a signature buffer, the signature for the data and an address of a storage location where the data resides.

10. The apparatus of claim 9 wherein storing the signature for the data and an address of a storage location where the data resides includes:
determining whether the signature for the data matches a signature in an entry of the signature buffer; and
responsive to determining that the signature for the data matches the signature in the entry of the signature buffer, refreshing the entry in the signature buffer.

11. The apparatus of claim 9 further comprising computer program instructions that, when executed by the computer processor, cause the apparatus to carry out the steps of:
identifying, in dependence upon predetermined removal rules, one or more entries to remove from the signature buffer; and
removing the one or more entries from the signature buffer.

12. The apparatus of claim 9 wherein determining whether the write data is a duplicate of the data stored at the address associated with the particular signature further comprises:
obtaining the data stored at the address; and
comparing the data stored at the address to the write data.

13. The apparatus of claim 9 further comprising computer program instructions that, when executed by the computer processor, cause the apparatus to carry out the step of, responsive to determining that the write data is the duplicate of the data stored at the address, returning a reference to the address.

14. The apparatus of claim 9 wherein determining whether the write data is a duplicate of the data stored at the address associated with the particular signature further comprises comparing the write data to data stored in a cache that is associated with information contained in the signature buffer.

15. A computer program product disposed upon a non-transitory computer readable medium, the computer program product comprising computer program instructions that, when executed, cause a computer to carry out the steps of:
determining, by the computer, whether a calculated signature for write data within a received write request matches a particular signature corresponding to particular data that was read from a storage device prior to the write request; and
based on a determination that the calculated signature for the write data matches the particular signature, comparing, by the computer, the particular data to the write data.

16. The computer program product of claim 15 further comprising computer program instructions that, when executed, cause the computer to carry out the steps of:
retrieving the data from one or more storage devices;
obtaining a signature for the data; and
storing, in a signature buffer, the signature for the data and an address of a storage location where the data resides.

17. The computer program product of claim 16 wherein storing the signature for the data and an address of a storage location where the data resides includes:
determining whether the signature for the data matches a signature in an entry of the signature buffer; and
responsive to determining that the signature for the data matches the signature in the entry of the signature buffer, refreshing the entry in the signature buffer.

18. The computer program product of claim 16 further comprising computer program instructions that, when executed, cause the computer to carry out the steps of:
identifying, in dependence upon predetermined removal rules, one or more entries to remove from the signature buffer; and
removing the one or more entries from the signature buffer.

19. The computer program product of claim 16 wherein determining whether the write data is a duplicate of the data stored at the address associated with the particular signature further comprises:
obtaining the data stored at the address; and
comparing the data stored at the address to the write data.

20. The computer program product of claim 16 wherein determining whether the write data is a duplicate of the data stored at the address associated with the particular signature further comprises comparing the write data to data stored in a cache that is associated with information contained in the signature buffer.

* * * * *